Aug. 21, 1934.  W. W. HARTMAN ET AL  1,971,105
HOSE COUPLING
Filed April 19, 1933
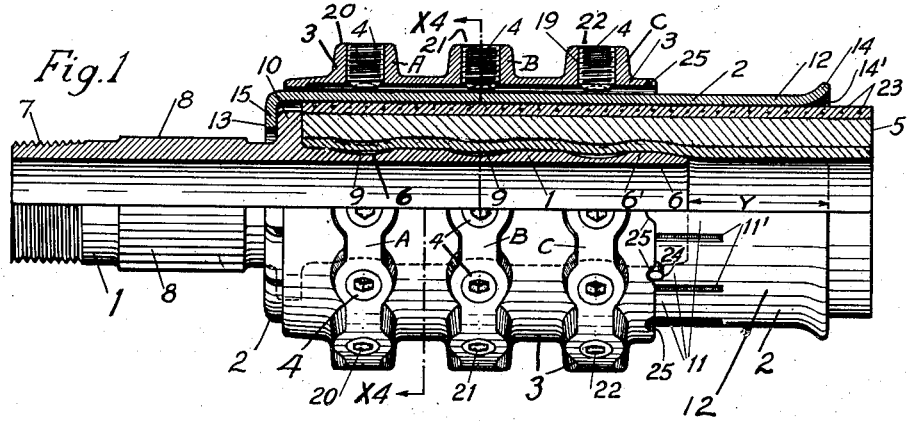
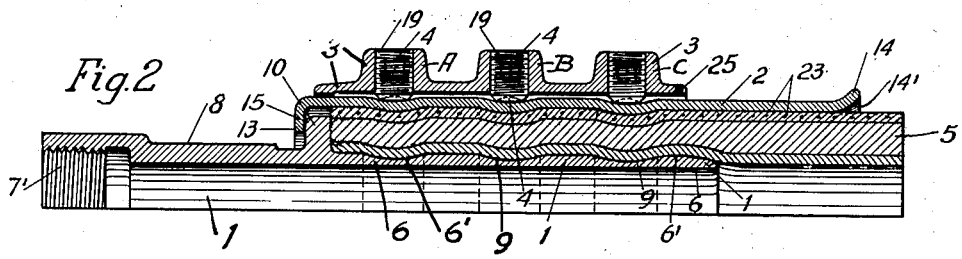
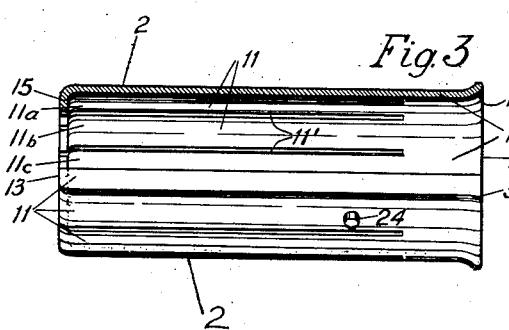
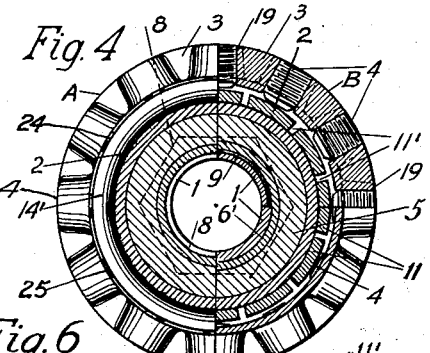
Robert Alexander Steps
William Walter Hartman INVENTORS
BY Robert Alexander Steps
ATTORNEY.

Patented Aug. 21, 1934

1,971,105

UNITED STATES PATENT OFFICE 1,971,105

HOSE COUPLING

William Walter Hartman and Robert Alexander Steps, Los Angeles, Calif.

Application April 19, 1933, Serial No. 666,790

15 Claims. (Cl. 285—84)

Our invention relates to couplings for hoses operating under very high pressures like rotary hoses in oil-well drilling equipment, and other hoses, where the fluid pressure sometimes rises to a thousand pounds per square inch, or more.

Hose couplings of the usual types in which the fastening screws operate either approximately tangentially of the surface of the hose, or else in a direction parallel to the axis of the hose to draw wedge-like clamping members onto the hose, are for various reasons not satisfactory when the pressure in the hose reaches the high amounts above indicated.

The trouble with those types of couplings in which the fastening screws operate tangentially, is that it becomes difficult to make these screws strong enough to permit setting such couplings very tight over the large areas of the clamping segments as required in these high-pressure hose couplings, and besides, the friction between the outer surface of the hose and the coupling segments as the latter are drawn around by tangentially operating screws, absorbs some of the energy of the screws so that the clamping effect is impaired by this friction. The friction between the parts of those types of couplings in which the fastening screws operate parallel to the axis of the hose to set up wedge-like clamping members, also counteracts the action of the screws and impairs the clamping effectiveness of these types of couplings, which obviously is a disadvantage when the pressures to be resisted are high. And in general all of the foregoing types of hose couplings are open to the objection that the outer clamping or hose-gripping member that bears directly on the outer surface of the hose and presses it inwardly, does not conform itself with sufficient ease or freedom to the constantly contracting shape of the outside of the hose as the clamping force is applied, and consequently this force is applied in somewhat spotty manner around the hose, instead of being a practically uniform force acting radially inward with approximately equal intensity all around the coupling, as should be the case in couplings that are expected to withstand severe fluid pressures in the hose.

One object of this invention is to so organize or combine the various parts of the hose coupling, that the clamping force acts radially inward with approximately equal intensity all around the coupling, and a feature of our invention that contributes to this is that we arrange our clamping screws in such manner that they exert their force in radial direction with reference to the hose, instead of tangentially thereto, or parallel to the axis thereof, and by this arrangement we are able to procure practically uniform clamping effect all around the coupling and of maximum intensity resulting in perfect sealing and gripping action between the hose and the coupling parts under the highest possible pressures attainable in practice today.

A further object and feature of our invention is to provide an outer hose-gripping member of a cage-like construction adapted to yield readily and uniformly in a radial direction when the coupling is set up on the hose.

Other objects, features, and benefits of our invention will become clear by consideration of the drawing, the following description, and the claims appended hereto.

In the drawing Fig. 1 is a side view of our coupling assembled on the hose, the upper half of this assembly being shown in section for clearness, and the clamping screws are shown as not yet fastened. Fig. 2 is similar to the upper half of Fig. 1, but shows the parts after the clamping screws have been fastened. At the left end, Fig. 2 shows the construction equipped with a female coupling expedient, whereas Fig. 1 shows it with a male coupling expedient, the difference having been made to illustrate the modification. Fig. 3 is a side view showing one form of our outer hose-gripping member, the upper half being shown in section. Fig. 4 is an end view of our assembled coupling, the right-hand half being shown in section taken on broken line $X^4$—$X^4$, looking in the direction of the arrows, as shown on Fig. 1. Fig. 5 is a diagrammatic view indicating various positions of the hose when used on rotary oil-well drilling equipment. Fig. 6 is a fragmental view indicating a modification of the cage construction shown in Fig. 3.

In the preferred form of our invention, our hose coupling may be said to consist of inner tubular hose-gripping means indicated generally by reference numeral 1 in the drawing; also outer hose-gripping means indicated generally by reference numeral 2; also a ring-like compressing member indicated generally by reference numeral 3; and the radially-acting screws 4 threaded through the compressing member 3.

The form or construction of each of these members can vary extensively without departing from the spirit of our invention as it will be understood that we have illustrated only a preferred form of our invention which we find effective and satisfactory in practice, and that the same is subject to extensive modification within the terms of our invention.

The inner hose-gripping means 1 is inserted into the end of hose 5 as shown at 6, Fig. 1, and it also has a coupling expedient 7 of any suitable form for making connection either to another hose, or to a pipe, tank, or the like. This coupling expedient 7, as shown in Fig. 1 may be a threaded male pipe connection, or as shown in Fig. 2 it may be a threaded female pipe connection 7', or if desired, it may as well be an ordinary flange coupling, or in fact any suitable coupling or connecting expedient. For convenience, the cross-section of this member 1 may, if desired, be made hexagonal at 8 to permit handy application of a wrench. Member 1 is spoken of as inner hose-gripping means because as the clamping screws 4, or other clamping expedients, are set up, this member 1 securely grips the inner surface of hose 5 to make a good seal between the hose and this member, and also to prevent this member from being blown out of the end of the hose under the action of high fluid pressure in the hose. The outer surface or contour 6' of the inserted portion 6, could if desired, be entirely smooth and cylindrical along its length, or could be screw threaded, or corrugated, or arranged with depressions of various sorts to increase the frictional grip between this member 1 and the inner surface of the hose. For this purpose however, we prefer to provide the outer surface 6', of portion 6, with one or more depressions 9 extending annularly or circumferentially around the inserted portion 6, as indicated by the dotted lines in Fig. 2. Also, for a purpose that will be hereinafter described, we prefer to provide this member 1 with an engaging portion 10 projecting outwardly therefrom in a general radial direction. This engaging portion 10 can be in the form of a flange running all around tubular member 1, or in the form of one or more projecting lugs, or in any other suitable form that will serve the engaging function hereinafter ascribed to it.

The next element of our coupling, namely the outer hose-gripping means, has for its function to grip the outer surface of hose 5 and to press the hose radially inward against the inserted portion of the inner hose-gripping means, this pressing being preferably done under action of the screws 4. In some of the broader aspects of our invention, the form or character of the outer hose-gripping means is quite immaterial so long as it performs the simple function ascribed to it. In a general way, however, we find that the function of this outer hose-gripping means is served better if it consists primarily of a plurality of elongated portions or bars indicated by reference numeral 11 in the figures, these bar-like members being preferably disposed side by side around the outer surface of the hose, and though these bar-like portions 11 are preferably straight as shown, they can be spiral if desired, and they can be entirely separate from each other, or connected in some manner, the latter being preferable as it facilitates easy assembling of the coupling, and has other advantages. By making this outer hose-gripping means in the form of a plurality of such narrow elongated bars arranged in close juxtaposition, i. e., side by side, around the outside of the hose, instead of in the form of a metallic sheet wrapped around the hose, this outer hose-gripping means is made very yieldable radially of the hose, as each bar-like member is free to move radially inward, particularly if these bars are not rigidly connected with each other. In practice, however, perfect radial resiliency of this outer hose-gripping means is not entirely necessary, and we find that without disadvantage a little of it can be sacrificed for the purpose of connecting these elongated bar-like members 11 together to constitute them into a unitary member that can be readily handled during installation or assembly of the coupling, and during production, shipment and sale of same. In the figures, particularly Fig. 3, we have shown a preferred form of assembling these elongated bar-like members into a single unitary structure, the same being in the form of a cage-like member of general cylindrical or sleeve-like shape. In order to produce such unitary cage-like construction, and yet preserve the desired maximum radial resiliency, we have found it helpful that each pair of neighboring bar-like members 11 should be connected to each other at one end only, and not at the other end, it being feasible to do this either in the manner shown in Fig. 3 or in the modification thereof shown in Fig. 6. In Fig. 6, it will be noted that one pair of neighboring bar-like members 11 is connected at one end and the next adjoining pair at the other end, but each such pair of neighboring bars is connected to each other only at one end or the other, and not at both ends; and in Fig. 3 the same general relation and result is procured only the neighboring bars comprising all pairs, are connected to each other at the same end, by means of the band or shell 12, whereas all the bars are otherwise entirely disconnected and free from each other along their entire length from this band 12 to the other end 13 of the cage. It might be helpful to illustrate a little more explicitly by stating that in Figs. 3 and 6, bars 11$^a$ and 11$^b$ comprise one pair of neighboring bars, while bars 11$^b$ and 11$^c$ comprise the next pair of neighboring bars, and so on around the cage, and it will be noted that each such pair is connected at one end only. Of course, if the bar-like members 11 are made long enough, and thin enough, they will have a fair degree of radial resiliency even if all bars are connected to each other at both ends, and this is embraced within the broader aspects of our invention, but in practice we are inclined to prefer that each pair of neighboring bars comprising the cage-like construction be connected to each other only at one end as indicated in Figs. 3 or 6, although it is realized that an effective cage can also be made if all bars are connected to each other at both ends. For a purpose that will be hereinafter mentioned, we find it helpful that at the end 14 of the cage the inner surface 14' thereof should taper outward as shown in Fig. 3, this effect being procured either by flaring the material itself outward as shown by the cross-section lines in Fig. 3, or by machining or casting this taper into the inner surface of the material only. For another purpose that will also be hereinafter described, we find it helpful that the outer hose-gripping means, whatever form is used, should have an inwardly projecting engaging portion adapted to engage the outwardly projecting engaging portion 10, of the inner hose-gripping member 1. Of course, the form of this engaging portion on the outer hose-gripping member will depend largely on the particular form of the engaging member or portion 10 on the inner hose-gripping means, but when the latter comprises an outwardly projecting flange or lug as illustrated in the accompanying drawing, then the engaging portion or expedient on the outer hose-gripping member can comprise the inwardly projecting portions 15 located at the end of the cage-like member 2. Whether this cage-like member is manufactured by casting it, or making it of tubular stock milled or slotted to form the elongated bars, or whether the bars are made from separate pieces of flat bar stock, and then welded together or otherwise joined at the ends, is of course, immaterial.

Another advantage of the unitary cage-like construction is best indicated in the sectioned half of Fig. 4, which shows the bar-like members 11 spaced equally from each other, that is, the spaces or slots 11' between the bars 11 are approximately equal, this being insured because of the unitary construction of the cage. If bars 11 were loose and entirely separate from each other, then during assembly they would naturally tend to gather close together in certain parts of the perimeter, and to spread further apart in other parts of the perimeter, and this would tend to permit leaks especially at the places where the larger gaps between bars 11 occur. Holding the bars 11 uniformly spaced from each other is therefore obviously an advantage especially where the pressure in the hose is very high.

Irrespective however of whether the narrow elongated bar-like members 11 are joined together in a unitary cage or not, we point out as a special feature of our invention that the circumferential width of each of these bars should be substantially less than its length, as several important results rest on this feature, especially when the coupling is used for hose transmitting fluids under very high pressure.

The next element to be described in detail is the ring-like compressing means that encircles our inner and outer hose-gripping means, and although this can take various forms, we nevertheless feel we have made a valuable contribution to the art of high pressure hose couplings by our invention, characterized by providing the ring-like compressing member with threaded holes 19 extending radially therethrough for the purpose of carrying the radially extending screws 4. These screws are the instruments by which the coupling is finally set up and fastened in place on the hose, and since in all forms of couplings the effective clamping force is ultimately exerted in a direction radial to the hose, irrespective of whether the clamping screws extend tangentially thereto, or parallel to the axis of the hose, we have found that the clamping effect can be made much more efficient, direct and intense when these screws operate radially in respect to the hose, because this is the direction that the clamping effect ultimately takes in all couplings anyway. By means of this invention we find that we can easily increase the clamping and sealing effect of the coupling to tremendous amounts, without encountering structural difficulties, and in this way our hose coupling has succeeded in handling very high pressures where other types of couplings were ineffective.

Of course, the particular manner in which the radial screws 4 are distributed with respect to each other and to the ring-like member 3, can vary according to the tastes of the designer, and the particular distribution of the screws will also depend on the nature and character of the other parts comprising the hose coupling. However, we like the arrangement in which each bar-like member 11 has one radial compressing screw 4, see Fig. 4. Also, when the depressions 9 in the outer contour 6', of the inner hose-gripping means, extend annularly around same, we prefer that the threaded holes 19 and the radial compression screws 4 extending therethrough should be arranged in circumferential rows as indicated at 20, 21, and 22, Fig. 1, extending around said ring-like compressing member 3, and these rows of screws should preferably be spaced from each other to approximately correspond with the spacing of the annular depressions 9. If arranged in this manner, the screws 4, when fastened down to the proper limit, tend to deform the bar-like members or portions 11 of the outer hose-gripping means, by pushing them radially inward toward said annular depressions 9, as indicated in Fig. 2 of the drawing. Whenever the screws are arranged in a plurality of circumferential rows around the compressing member 3, we also consider it a further advantage to arrange the screws in straight lines extending lengthwise of the coupling and parallel to the axis of the hose and compressing member 3, the arrangement and spacing being preferably such that each such straight line of screws can bear upon one of the straight bars 11 of the outer hose-gripping member 2. In these high-pressure hoses, the wall 5 as indicated in Figs. 1 and 2, is very thick, and consists of various admixtures including rubber and fabric, and also sometimes wire reinforcing 23, and the thickness of such hose, of course, compresses under the action of radial screws 4, and readily conforms to the distorted contour required by the bar-like members 11 under the radial action of screws 4. It is self-evident that when the hose material is forcibly keyed into grooves 9 by the curves or distortions in bars 11 under screws 4, it is very hard for the hose to pull out between the inner and outer hose-gripping means 1 and 2, respectively, and the sealing action between the hose and the inserted tubular member 1 is very efficient, and gives maximum assurance against leaks, as the rows of screws can force the hose into the annular grooves or depressions 9 with tremendous effect that is ample to overcome the highest pressures that the hose will stand. Should a leak appear along any element of the hose, the screws 4 nearest that element can be set up further, and the leak stopped in this manner. This ability to tighten our hose in certain local areas to counteract leaks that may develop at those areas, is a unique feature of our coupling and results from our using a multiplicity of radially-acting screws 4. In order to make the compressing power in the rows of screws 20, 21, 22, etc., Fig. 1, very high, and still keep the weight of ring-like member 3 reasonably low, we have built up the radial depth of the ring material in the vicinity of these rows of screws 20, 21, and 22, so as to make strong heavy continuous bands or hoops A, B, and C, running all around member 3. This not only gives lots of depth to the threaded holes 19, so the threads will not strip, but also gives tremendous hoop tension to these bands A, B, and C, thereby raising the clamping power of screws 4 to very large amounts. Of course, if the designer should for any reason prefer, he can make the ring-like member 3 of large uniform thickness throughout, omitting hoops A, B, and C, and instead of arranging screws 4 in rings or rows around the coupling, he can arrange them in helical manner, or in any other manner or distribution that he considers suitable, but we prefer the arrangement shown, especially when depressions 9 in the outer contour of the inner hose-gripping member extend annularly around same. It is self-evident that the number of such rows of screws can vary according to the total clamping and sealing effect desired. In the figures we have shown three such rows, 20, 21, and 22, for the reason that we find this good general practice, but for certain purposes one or two such rows would suffice, and for other purposes more than three rows would be helpful, and as previously indicated, these screws can be arranged otherwise than in rows, but we prefer that they should operate radially or substantially so. As a matter of fact, the strong heavy hoops A, B, and C can be entirely separate and free from each other, and can be slipped onto the coupling one after the other during installation, but for the convenience of the user, we prefer, when there is more than one such hoop, to join them together in any suitable manner that will hold them correctly spaced from each other, and for this purpose, we find the shell-like arrangement indicated in Figs. 1, 2 and 3, very satisfactory, although other modes could be devised for holding the hoops A, B and C together.

In the drawing, we have shown screws 4 to be conventional headless set screws, as these improve the appearance of the coupling, and by avoiding projecting heads, add somewhat to the safety of the device, although ordinary screws with heads can be substituted if desired. We also prefer the screws to be short enough so they will not project on the outside when the coupling is made up. To insure uniform setting of the screws, we like to start all screws flush with the outside contour of the ring member 3, as indicated in Fig. 1. The mechanic then gives each screw a definite angular rotation, say one turn, starting first on one row of screws, and then taking the next row, etc. After all the screws have made one turn, the screw that was first rotated is then started on the second lap, that is, is given a second turn, and so on till all the screws have received the second turn; then they are all given a third turn, etc., until the coupling is completely fastened. This assures uniform tightening not only around one row of screws, but as between the different rows as well, and in this manner the intensity of the clamping force is obviously very uniform throughout the entire coupling. This is particularly true when the outer hose-gripping means 2 is of cage-like construction indicated in the figures, and the importance of this uniformity cannot be over-emphasized when attempting to produce a good dependable leak-proof job on high-pressure work. Incidentally, in Fig. 4, the bar-like members 11 are shown as segments of a circle, this being naturally preferred, but if these members 11 are straight flat bars, instead of arcs of a circle, the results will be fairly satisfactory, particularly if the width of each bar is not large.

One advantage in having the screws arranged in annular rows, each overlying a depression 9 in the inner hose-gripping member, is that each such row and its corresponding depression 9 constitute an ideal sealing locality extending entirely around the tubular member 1, so as to cut off any stream that might tend to leak lengthwise of the hose past same, and the more there are of such rows of screws with the corresponding depression 9 for each, the more such perfect sealing localities there will be, and the more certain the user is that no leaks will occur as one or another of these sealing localities located successively in the length of the coupling will most certainly cut off the leak.

Wherever the term inner or outer hose-gripping means or member is used herein, the gripping action referred to is that which is set up because of the action of the screws or other clamping expedient, and does not refer to the relatively slight frictional gripping effect which may or may not be set up when such means or members are first slipped into or onto the hose before the screws are set up. In fact, to facilitate easy assembly of the coupling on the hose, the inner and outer hose-gripping members may be so proportioned as to pass freely into place on the hose, as the action of the clamping screws when finally set up will cause the hose to be very securely gripped between said inner and outer hose-gripping means irrespective of whether either or both of these members had any initial frictional grip on the hose or not, and irrespective of whether their gripping surface was entirely smooth or had depressions, like depressions 9 of the inner hose-gripping means, or depressions or serrations of any other shape that make the surface irregular for the purpose stated.

The object of the previously described outwardly and inwardly engaging portions 10 and 15, or their equivalent, respectively on the inner and outer hose-gripping members 1 and 2, is to more effectively prevent the inner member 1 from being blown out of the end of the hose by high pressure. The frictional grip of this member against the inner wall of the hose, of course, tends to prevent such blowout, but in cases of very high fluid pressure, this grip of the inner member alone against the hose may not be sufficient, and for this reason the additional frictional grip of the outer hose-gripping member 2 is brought into play by having the inwardly-projecting engaging portion 15 thereof, or its equivalent, engage portion 10, or its equivalent, on the inner member 1, and in this way the resistance against blowing inner member 1 out of the end of the hose is obviously greatly increased. The annular rows of screws acting right over the annular depressions 9, further tend to prevent the blowing out of the inner member 1 from the hose.

If the bars 11 of the outer hose-gripping means are thick enough radially, they will, of course, not be distorted under the action of the screws in the manner indicated in Fig. 2, and a moderately good hose coupling involving some features of our invention, can be produced in this manner, although we prefer that bars 11 should be thin enough to deflect approximately as shown in Fig. 2.

The reason for having the inner surface at the end of the outer hose-gripping member beveled or tapered outwardly as indicated at 14', can be best understood by reference to Fig. 5. In this figure, the dot-and-dash lines 5' and 5'' indicate different positions that the hose takes when used in rotary oil-well drilling. Member 30 indicates the conventional swivel, which does not rotate, but moves up and down as the drilling proceeds, as for instance between its full line position shown in Fig. 5, and its dotted line position shown at 30'. To permit this movement is one of the functions of the hose, which is connected in obvious manner to the stationary pipe connection 31 in the drill derrick and to the vertically moveable pipe connection 32 on swivel 30, the connection being made by virtue of there being at each end of the hose one of our couplings illustrated in Figs. 1 or 2. In practice, the normal bending of the hose between extreme positions, is greater than that indicated diagrammatically by lines 5' and 5'', Fig. 5, but the latter suffice to indicate that a fair amount of bending and buckling of the hose occurs. The object of tapering or beveling the inside surface of the end of the outer hose-gripping member, as at 14', is to prevent cutting of the outside surface of the hose as the swinging and bending of same occur, and for the same reason we prefer that the outer hose-gripping means 2 should project beyond the end of the inner hose-gripping means 1, by an amount indicated generally by dimension Y in Figure 1. The outer hose-gripping member then prevents the hose from bending back and forth on the end of the inner hose-gripping member, which latter might tend to cut the inner surface of the hose if this bending action were not prevented by having the outer hose-gripping means longer than the inner, and beveled at 14', as indicated.

Should it be desired to make the unitary cage-like member 2 still more resilient so it can be very easily slipped onto the hose even if latter is a little oversize, one of the slots 11' can be continued across the entire length of the cage, such continuation being indicated at 33 in Fig. 3, and in this case the shell or band-like portion 12 will be split to provide the yielding quality just referred to, but all this is within the terms and spirit of our invention, and the cylindrical cage will still be unitary even though split in this manner.

Also, in order to correctly position screws 4 with reference to bars 11, so that the screws bear approximately on the centers of these bars as indicated in Fig. 4, or bear thereon in some other desired manner, some suitable positioning expedient can be used, as for instance notches 25 in the compression ring 3, see Fig. 1, registering with the pin or projecting lug 24 of the cage-like member 2, to bring screws 4 into correct position on bars 11. Of course, it is a simple matter to correctly position the screws 4 with reference to the bars 11 by merely sighting the same, and a very good assembly job can easily be done by an ordinary mechanic without using any positioning expedient whatever. In practice we hardly ever use such positioning expedient, but we mention it in case others should like to do so.

This concludes the detailed description of our coupling, and it is thought that the construction and operation of same will be clear without further illustration. In assemblying the coupling on the end of hose 5, our usual procedure is to insert the inner hose-gripping member into the end of the hose; then to slip the outer hose-gripping member 2 over the hose, then to slip the ring-like compressing member 3 into position shown in the drawing, and then fasten the radially-acting screws 4 in the manner previously indicated. The precise proceduce, of course, varies with the particular form of our invention that is adopted.

It is apparent from the foregoing that our invention includes several features and parts, and that in various modifications of our coupling some of these features or parts can be omitted or extensively modified, and some can be used separately to good advantage without using all or any of the others, all this being however, within the terms and spirit of our invention which is not limited except by the language of the appended claims.

We claim:

1. A coupling for hose adapted to transmit fluids under very high pressures, comprising a strong substantial tubular inner hose-gripping member having a coupling expedient and being adapted to be inserted into the end of a hose, and means for clamping said hose thereto comprising elongated bar-like outer hose-gripping members disposed in close juxtaposition around the outside of the hose and extending lengthwise thereof, the circumferential width of each such bar-like member being less than its length, ring-like means having a plurality of threaded holes extending substantially radially therethrough, and radially extending screws fitting in said threaded holes, said ring-like means being adapted to encircle said inner and outer hose-gripping members and said plurality of screws being adapted to bear upon said elongated bar-like outer hose-gripping members to force them inward to securely grip the hose between said inner and outer hose-gripping members.

2. A coupling for hose adapted to transmit fluids under very high pressures, comprising a strong substantial tubular inner hose-gripping member having a coupling expedient and being adapted to be inserted into the end of a hose and means for clamping said hose thereto comprising narrow elongated bar-like outer hose-gripping members disposed in close juxtaposition around the outside of the hose and extending lengthwise thereof, the circumferential width of each such bar-like member being substantially less than its length, a ring-like member having a plurality of threaded holes extending substantially radially therethrough, and radially extending screws fitting in said threaded holes, said ring-like member being adapted to encircle said inner and outer hose-gripping members, and one of said screws being adapted to bear upon each of said narrow elongated bar-like outer hose-gripping members to force them inward to securely grip the hose between said inner and outer hose-gripping members.

3. A coupling for hose adapted to transmit fluids under very high pressures, comprising a strong substantial tubular inner hose-gripping member having a coupling expedient and being adapted to be inserted into the end of a hose, and means for clamping said hose thereto comprising elongated bar-like outer hose-gripping members disposed in close juxtaposition around the outside of the hose and extending lengthwise thereof, the circumferential width of each such bar-like member being substantially less than its length, a ring-like member having a plurality of threaded holes extending substantially radially therethrough, and radially extending screws fitting in said threaded holes, said ring-like member being adapted to encircle said inner and outer hose-gripping members, and said plurality of threaded holes and screws in said ring-like member being arranged in parallel straight lines extending lengthwise of said ring-like member, said screws in the ring-like member being adapted to bear upon said elongated bar-like outer hose-gripping members to force them inward to securely grip the hose between said inner and outer hose-gripping members.

4. A coupling for hose adapted to transmit fluids under very high pressures, comprising a strong substantial tubular inner hose-gripping member having a coupling expedient and being adapted to be inserted into the end of a hose, and means for clamping said hose thereto comprising narrow elongated bar-like outer hose-gripping members disposed in close juxtaposition around the outside of the hose and extending lengthwise thereof, the circumferential width of each such bar-like member being substantially less than its length, ring-like means having a plurality of threaded holes extending substantially radially therethrough, said ring-like means being adapted to encircle said inner and outer hose-gripping members, and said plurality of threaded holes and screws being arranged in a plurality of circumferential rows extending around said ring-like means and being also arranged in straight lines extending substantially parallel to the length of the hose, said screws in said ring-like means being adapted to bear upon said narrow elongated bar-like outer hose-gripping members to securely grip the hose between said inner and outer hose-gripping members.

5. A coupling for hose adapted to transmit fluid under very high pressure, comprising strong substantial tubular inner hose-gripping means having a coupling expedient and being adapted to be inserted into the end of a hose, the inserted portion of said tubular inner hose-gripping means being provided with an irregular outer surface to effectively grip the inner surface of the hose, outer hose-gripping means adapted to grip the outside of the hose, a ring-like member having threaded holes extending substantially radially therethrough, and radially extending screws fitting in said threaded holes, said ring-like member being adapted to encircle said inner and outer hose-gripping means and said screws being adapted to radially butt against and force said outer hose-gripping means inward to securely grip the hose between said inner and outer hose-gripping means.

6. A coupling for hose adapted to transmit fluid under very high pressure, comprising strong substantial tubular inner hose-gripping means having a coupling expedient and being adapted to be inserted into the end of a hose, the inserted portion of said tubular inner hose-gripping means having a depression in its outer contour, outer hose-gripping means adapted to grip the outside of the hose, a ring-like member having threaded holes extending substantially radially therethrough, and radially-extending screws fitting in said threaded holes, said ring-like member being adapted to encircle said inner and outer hose-gripping means and said screws being adapted to radially butt against and force said outer hose-gripping means inward toward said depression in the outer contour of said tubular inner hose-gripping means to securely grip the hose between said inner and outer hose-gripping means.

7. A coupling for hose adapted to transmit fluid under very high pressure, comprising strong substantial tubular inner hose-gripping means having a coupling expedient and being adapted to be inserted into the end of a hose, the inserted portion of said inner hose-gripping means having a depression extending circumferentially around the outer contour thereof, outer hose-gripping means adapted to grip the outside of the hose, a ring-like member having threaded holes extending substantially radially therethrough, and radially-extending screws fitted in said threaded holes, said ring-like member being adapted to encircle said inner and outer hose-gripping means, said screws and threaded holes being arranged in a row circumferentially around said ring-like member, and the screws comprising said row being adapted to radially butt against and force said outer hose-gripping means inward toward said depression in the outer contour of said inner hose-gripping means, to securely grip the hose between said inner and outer hose-gripping means.

8. A coupling for hose adapted to transmit fluid under very high pressure, comprising strong substantial tubular inner hose-gripping means having a coupling expedient and being adapted to be inserted into the end of a hose, the inserted portion of said inner hose-gripping means having a plurality of depressions extending circumferentially around the outer contour thereof, outer hose-gripping means adapted to grip the outside of the hose, ring-like means having threaded holes extending substantially radially therethrough, and radially-extending screws fitted in said threaded holes, said ring-like means being adapted to encircle said inner and outer hose-gripping means, said screws and threaded holes being arranged in a plurality of circumferential rows around said ring-like member, said rows being spaced to approximately correspond with and overlie said depressions in the contour of said inner hose-gripping means, and said screws being adapted to radially butt against and force said outer hose-gripping means inward to securely grip the hose between said inner and outer hose-gripping means.

9. A hose coupling comprising tubular inner hose-gripping means having a coupling expedient and being adapted to be inserted into the end of a hose, the inserted portion thereof having a plurality of depressions extending circumferentially around the outer contour thereof, said inner hose-gripping means also having an outwardly projecting engaging portion thereon, cage-like outer hose-gripping means of a generally sleeve-like shape adapted to slip over the outside of the hose and comprising elongated bar-like members disposed side by side around the hose, said cage-like outer hose-gripping means having an engaging portion projecting inwardly and being adapted to engage said outwardly projecting portion of the inner hose-gripping means to resist blowing said inner hose-gripping means out of the hose under action of fluid pressure, a ring-like member having threaded holes extending substantially radially therethrough, and radially-extending screws fitting in said threaded holes, said ring-like member being adapted to encircle said inner and outer hose-gripping means, said screws and a plurality of threaded holes being arranged in a plurality of circumferential rows around said ring-like member, said rows being spaced to approximately correspond with and overlie said circumferentially extending depressions in the outer contour of said inner hose-gripping means, and said screws being adapted to radially butt against and force said bar-like members of said outer hose-gripping means inward toward said circumferentially extending depressions on the outer contour of said inner hose-gripping means, to securely grip the hose between said inner and outer hose-gripping means.

10. A coupling for hose adapted to transmit very high pressures, comprising a strong tubular inner hose-gripping member having a coupling expedient and being adapted to be inserted into the end of a hose, the inserted portion of said inner hose-gripping member having a plurality of depressions extending circumferentially around the outer contour thereof, bar-like outer hose-gripping members adapted to grip the outside of the hose, a ring-like member having a plurality of threaded holes extending substantially radially therethrough, and radially extending screws fitting in said threaded holes, said rink-like member being adapted to encircle said inner and outer hose-gripping members, and said plurality of threaded holes and screws being arranged in a plurality of circumferential rows that are spaced from each other to approximately correspond with and permit them to overlie said depressions in the outer contour of said inner hose-gripping member, said threaded holes and screws being also arranged in straight lines extending substantially parallel to the axis of said ring-like member, and said screws being adapted to bear upon said bar-like outer hose-gripping members to force them inward to securely clamp the hose between said inner and outer hose-gripping members.

11. A hose coupling comprising tubular inner hose-gripping means adapted to be inserted into the end of a hose and having a coupling expedient, outer hose-gripping means adapted to grip the outside of the hose, a ring-like member including a plurality of strong heavy hoops held in spaced relation to each other, a plurality of threaded holes extending radially through each of said hoops, and radially-extending screws fitting in said threaded holes, said ring-like member being adapted to encircle said inner and outer hose-gripping means and said screws being adapted to radially butt against and force said outer hose-gripping means inward to securely grip the hose between said inner and outer hose-gripping means.

12. A hose coupling comprising a tubular inner hose-gripping member having a coupling expedient and being adapted to be inserted into the end of a hose, the inserted portion of said inner hose-gripping member having a plurality of depressions extending circumferentially around the outer contour thereof, a unitary cage-like outer hose-gripping member adapted to slip over the end of the hose and lie lengthwise thereof, said cage-like outer hose-gripping member having a plurality of relatively narrow elongated bar-like portions that are adapted to lie substantially parallel to the length of the hose, a ring-like member having a plurality of threaded holes extending substantially radially therethrough, and radially extending screws fitting in said threaded holes, said ring-like member being adapted to encircle said inner and outer hose-gripping members, and said plurality of threaded holes and screws being arranged in a plurality of circumferential rows that are spaced from each other to approximately correspond with and permit them to overlie said depressions in the outer contour of said inner hose-gripping member, said threaded holes and screws being also arranged in straight lines extending lengthwise of said ring-like member and substantially parallel to the axis thereof, said straight lines of screws being so spaced with reference to each other that one such straight line of screws can bear upon each of said relatively narrow elongated bar-like portions of said outer hose-gripping member to force the same inward to securely grip the hose between said inner and outer hose-gripping members.

13. A hose coupling comprising a tubular inner hose-gripping member adapted to be inserted into the end of a hose and having a coupling expedient, bar-like outer hose-gripping members adapted to grip the outside of the hose, a ring-like member including a plurality of strong heavy hoops held in spaced relation to each other, a plurality of threaded holes extending radially through each of said hoops, and radially extending screws fitting in said threaded holes, said threaded holes and screws in said hoops being arranged in straight lines extending lengthwise of said ring-like member and substantially parallel to the axis thereof, said ring-like member being adapted to encircle said inner and outer hose-gripping members, and said screws being adapted to radially butt against and force said bar-like outer hose-gripping members inward to securely grip the hose between said inner and outer hose-gripping members.

14. A ring-like compressing member for a hose coupling, comprising a plurality of strong heavy hoops held in spaced relation to each other, each of said hoops having a plurality of threaded holes extending substantially radially therethrough, and radially extending screws fitting in said threaded holes, the said threaded holes and screws in said hoops being also arranged in straight lines extending lengthwise of said ring-like compressing member and substantially parallel to the axis thereof.

15. A hose coupling comprising tubular inner hose-gripping means adapted to be inserted into the end of a hose and having a coupling expedient, cage-like outer hose-gripping means of a generally cylindrical shape adapted to slip over the outside of the hose and comprising elongated bar-like members disposed side by side to conform with said general cylindrical shape, a ring-like member having threaded holes extending substantially radially therethrough, and radially extending screws fitting in said threaded holes, said ring-like member and said cage-like outer hose-gripping means having a positioning expedient adapted to register when said screws are positioned in a desired relation to said bar-like members of said cage-like outer hose-gripping means.

WILLIAM WALTER HARTMAN.
ROBERT ALEXANDER STEPS.